United States Patent [19]

Yamamoto et al.

[11] Patent Number: 5,334,667
[45] Date of Patent: Aug. 2, 1994

[54] VULCANIZABLE, FLUORINE-CONTAINING ELASTOMER COMPOSITION

[75] Inventors: Yuichi Yamamoto, Takahagi; Haruyoshi Tatsu, Hitachi, both of Japan

[73] Assignee: Nippon Mektron, Limited, Tokyo, Japan

[21] Appl. No.: 172,730

[22] Filed: Dec. 27, 1993

[30] Foreign Application Priority Data

Dec. 28, 1992 [JP] Japan .................. 4-358541

[51] Int. Cl.$^5$ .............................. C08F 8/42
[52] U.S. Cl. ........................... 525/370; 525/245; 525/276; 525/326.3
[58] Field of Search ................. 525/370, 245

[56] References Cited

U.S. PATENT DOCUMENTS

| 3,853,828 | 12/1974 | Wall et al. | 525/326.3 |
| 4,243,770 | 1/1981 | Tatemoto et al. | 525/326.3 |
| 4,900,793 | 2/1990 | Lagow et al. | 525/356 |
| 5,142,934 | 9/1992 | Ito et al. | 525/326.3 |
| 5,159,026 | 10/1992 | Masatoshi | 525/387 |
| 5,219,904 | 6/1993 | Abe | 525/343 |

Primary Examiner—Bernard Lipman
Attorney, Agent, or Firm—Fred Philpitt

[57] ABSTRACT

By using salicylaldoimino copper complex having the following formula as a cross-linking agent for a fluorine-containing elastomer containing at least one of iodine and bromine in the molecule, a vulcanization product with an improved heat resistance can be obtained and generation of harmful substances such as methyl iodine, methyl bromine, etc. can be made less at the cross-linking:

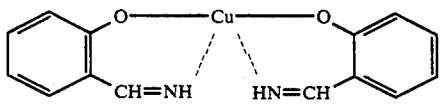

6 Claims, 1 Drawing Sheet

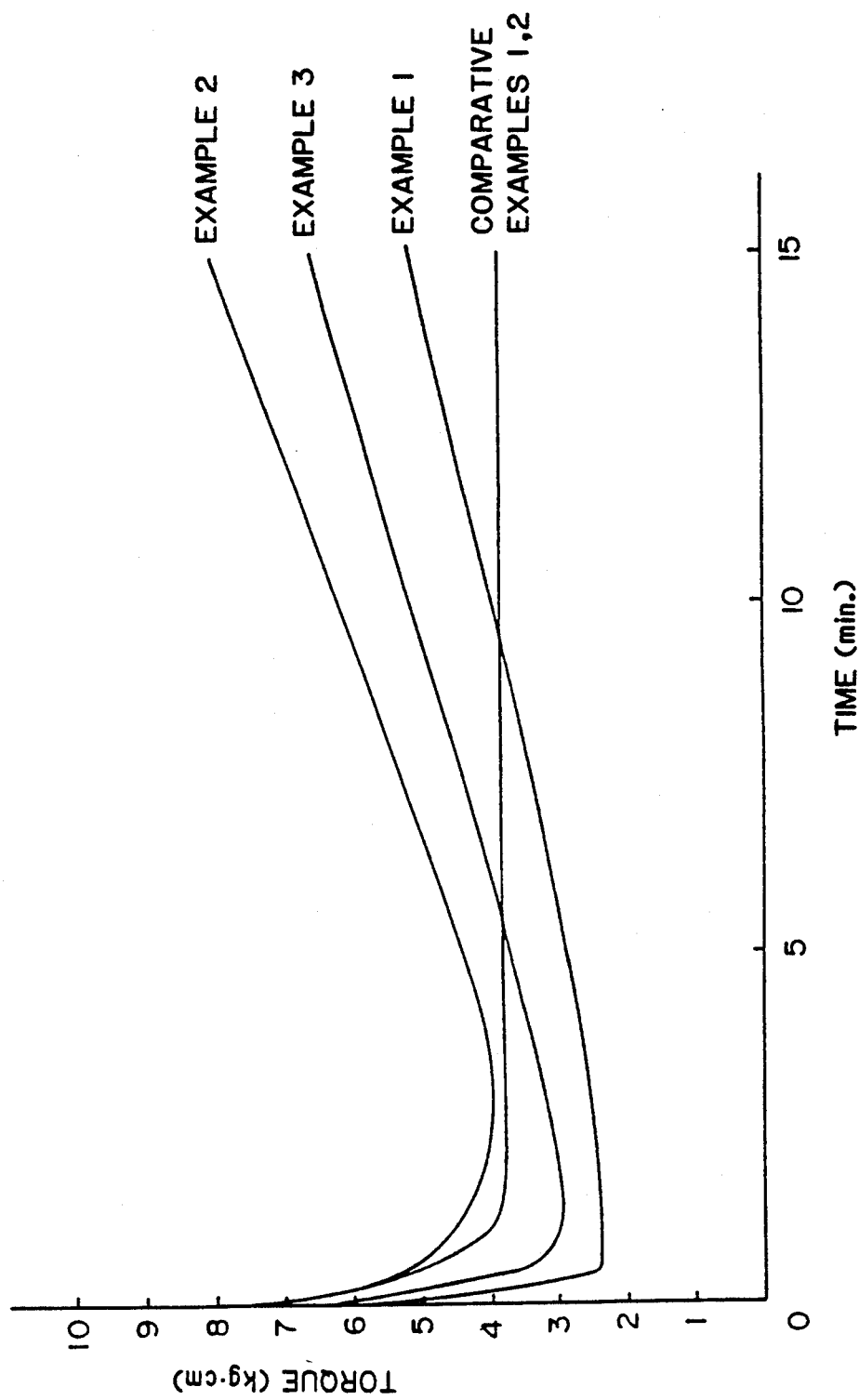

VULCANIZABLE, FLUORINE-CONTAINING ELASTOMER COMPOSITION

BACKGROUND OF THE INVENTION

1. Field of the Invention

The present invention relates to a vulcanizable, fluorine-containing elastomer composition, and more particularly to a fluorine-containing elastomer composition which comprises a fluorine-containing elastomer containing at least one of iodine and bromine in the molecule, and a novel type of a vulcanizing agent.

2. Related Art

In the vulcanization of fluorine-containing elastomers containing at least one of iodine and bromine in the molecule, an organic peroxide is usually used as a cross-linking agent, and triallyl isocyanurate, etc. are used as a cross-linking aid.

SUMMARY OF THE INVENTION

An object of the present invention is to provide a vulcanizable, fluorine-containing elastomer composition, which comprises a fluorine-containing elastomer containing at least one of iodine and bromine, and quite a different type of a cross-linking agent for cross-linking the elastomer from the so far used organic peroxide.

DETAILED DESCRIPTION OF PREFERRED EMBODIMENTS

According to the present invention, there is provided a vulcanizable fluorine-containing elastomer composition, which comprises a fluorine-containing elastomer containing at least one of iodine and bromine in the molecule, and salicylaldoimino copper complex having the following formula as a cross-linking agent:

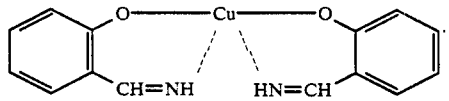

Commercially available salicylaldoimino copper complex itself can be used as the complex represented by the above formula in the present invention.

In the present invention, about 0.1 to about 20 parts by weight, preferably about 1 to about 10 parts by weight, of salicylaldoimino copper complex is used per 100 parts by weight of a fluorine-containing elastomer containing at least one of iodine and bromine.

Fluorine-containing olefins constituting the main part of a fluorine-containing elastomer containing at least one of iodine and bromine in the molecule for use in the present invention have preferably 2 to 8 carbon atoms and include, for example, vinylidene fluoride, tetrafluoroethylene, hexafluoropropene, pentafluoropropene, chlorotrifluoroethylene, methyl perfluorovinyl ether, ethyl perfluorovinyl ether, n- or iso-propyl perfluorovinyl ether, n-, iso- or tert-butyl perfluorovinyl ether, n- or iso-amyl perfluorovinyl ether, perfluoro(methyl vinyl ether), perfluoro(ethyl vinyl ether), perfluoro(n- or iso-propyl vinyl ether), perfluoro(n-, iso- or tert butyl vinyl ether), perfluoro(n- or iso-amyl vinyl ether), perfluoro(propoxypropyl vinyl ether), etc. at least one of which is mainly used. Besides the foregoing compounds, vinyl fluoride, trifluoroethylene, perfluorocyclobutene, perfluoro-(methylcyclopropene), hexafluoroisobutene, 1,2,2-trifluorostylene, perfluorostyrene, etc. can be used.

These fluorine-containing olefins can be also copolymerized with at least one of olefinic compound having 2 to 6 carbon atoms and fluorine-containing dienes having 4 to 8 carbon atoms.

The olefinic compound has 2 to 6 carbon atoms and includes, for example, olefins such as ethylene, propylene, butene; unsaturated vinyl esters such as vinyl acetate, and alkyl vinyl ethers such as methyl vinyl ether, ethyl vinyl ether, and is generally copolymerized in a proportion of about 0.1 to about 50% by mole as contained in the fluorine-containing elastomer.

The fluorine-containing diene has 4 to 8 carbon atoms, and includes, for example, perfluoro-1,3-butadiene, perfluoro-1,4-pentadiene, 1,1,2-trifluoro-1,3-butadiene, 1,1,2-trifluoro-1,4-pentadiene, 1,1,2,3,3-pentafluoro-1,4-pentadiene, perfluoro-1,7-octadiene, perfluorodivinyl ether, perfluorovinyl perfluoroallyl ether, vinyl perfluoroallyl ether, perfluorovinyl vinyl ether, etc. It is preferable that the fluorine-containing diene is copolymerized in a proportion of not more than 1% by mole, as contained in the fluorine-containing elastomer. When copolymerized in a proportion above about 1% by mole, the copolymer elastomer undergoes considerable gelation, deteriorating the processability (flow characteristics) and the elongation of the vulcanized products.

Specific fluorine-containing olefin copolymers include. for example, hexafluoropropene-vinylidene fluoride copolymer, hexafluoropropene-vinylidene fluoride-tetrafluoroethylene terpolymer, tetrafluoroethylene-vinylidene fluoride-perfluoro(methyl vinyl ether) terpolymer, tetrafluoroethylene-vinylidene fluoride-perfluoro(propyl vinyl ether) terpolymer, tetrafluoroethylene-perfluoro(propoxypropyl vinyl ether) copolymer, tetrafluoroethylene-perfluoro(methyl vinyl ether) copolymer, tetrafluoroethylene-propylene copolymer, tetrafluoroethylene-vinylidene fluoride-hexafluoropropene-pentafluoropropene quaternary copolymer, tetrafluoroethylene-hexafluoropropene-vinylidene fluoride-perfluoro(methyl vinyl ether) quaternary copolymer, tetrafluoroethylene-hexafluoropropene-hexafluoroisobutene terpolymer, tetrafluoroethylene-cyclohexyl vinyl ether copolymer, hexafluoropropene-vinylidene fluoride-chlorotrifluoroethylene terpolymer, vinylidene fluoride-tetrafluoroethylene-methyl perfluorovinyl ether terpolymer, vinylidene fluoride-tetrafluoroethylene-n-butyl perfluorovinyl ether terpolymer, vinylidene fluoride-methyl perfluorovinyl ether-perfluoro(methyl vinyl ether) terpolymer, tetrafluoroethylene-methyl perfluorovinyl ether-perfluoro(methyl vinyl ether) terpolymer, vinylidene fluoride-hexafluoropropene-tetrafluoroethylene-methyl perfluorovinyl ether quaternary copolymer, tetrafluoroethylene-n-butyl perfluorovinyl ether-perfluoro(methyl vinyl ether) terpolymer, vinylidene fluoride-n-butyl perfluorovinyl ether copolymer, tetrafluoroethylene-propylene-n-butyl perfluorovinyl ether terpolymer, tetrafluoroethylenevinylidene fluoride-propylene-n-butyl perfluorovinyl ether quaternary copolymer, etc.

Polymerization reaction of fluorine-containing olefins or fluorine-containing olefins with the comonomers above mentioned is carried out by a so far well known method, for example, solution polymerization, suspension polymerization or emulsion polymerization.

When the polymerization reaction is carried out in the presence of an iodine and bromine-containing compound, an iodine-containing compound or a bromine-containing compound, iodine and/or bromine is introduced into the fluorine-containing olefin copolymers to form crosslinking points for the organic peroxide crosslinking.

The iodine and bromine-containing compound is saturated or unsaturated linear or aromatic compounds represented by the general formula:

$$RBR_nI_m$$

wherein R is a fluorohydrocarbon group, chlorofluoro hydrocarbon group, chlorohydrocarbon group or hydrocarbon group and n and m are 1 or 2 and preferably n and m are each 1. The linear iodine and bromine-containing compound for use in the present invention includes, for example. 1-bromo-2-iodoperfluoroethane, 1-bromo-3-iodoperfluoropropane, 1-bromo-4-iodoperfluorobutane, 2-bromo-3-iodoperfluorobutane, 3,4-dibromo-1-iodo-1,1,2,2,4,4-hexafluorobutane, 3-bromo-4-iodoperfluorobutene-1, 2-bromo-4-iodoperfluorobutene-1, etc. The aromatic iodine and bromine-containing compound for use in the present invention includes, for example, monoiodomonobromo-substituted benzenes, diiodomonobromo-substituted benzenes, monoiododibromo-substituted benzenes. (2-iodoethyl) and (2-bromoethyl)-substituted benzenes, etc. at various substitution positions. These iodine and bromine-containing compounds generally combine with the fluorine-containing olefin copolymers at the molecule terminals to give fluorine-containing elastomers capable of efficiently making the crosslinking. To this end, about 0.001 to about 5% by weight, preferably about 0.01 to about 3% by weight, of the iodine and bromine-containing compound in terms of iodine and bromine is made to combine with the fluorine-containing olefin copolymers.

As the iodine-containing compound, aromatic compounds or perfluoroaromatic compounds polysubstituted with iodine atoms or iodoalkyl groups, for example, iodoethyl group, are used in a combining ratio of about 0.001 to about 5% by weight, preferably about 0.001 to about 3% by weight, in terms of the iodine in the fluorine-containing elastomer or iodo-substituted, saturated or unsaturated aliphatic hydrocarbons, fluoroaliphatic hydrocarbons or chlorofluoroaliphatic hydrocarbons are used in a combining ratio of about 0.001 to about 10% by weight in terms of the iodine in the fluorine-containing etastomer.

As the bromine-containing compound, aromatic compounds or perfluoroaromatic compounds polysubstituted with bromine atoms or bromoalkyl groups, for example, bromoethyl group, are used in a combining ratio of about 0.001 to about 5% by weight, preferably about 0.01 to about 3% by weight, in terms of the bromine in the fluorine-containing elastomer, or bromine-substituted saturated aliphatic hydrocarbons are used in a combining ratio of about 0.001 to about 10% by weight in terms of the bromine in the fluorine-containing elastomer, or bromine-containing olefins are used in a combining ratio of about 0.05% by weight or more, generally about 0.3 to about 1.5% by weight, in terms of the bromine in the fluorine-containing elastomer. Furthermore, 3- or 2-bromoperfluoropropyl perfluorovinyl ether, etc. can be also used.

The present composition can be prepared by mixing the above-mentioned essential components together with a filler such as carbon black, etc.; an acid recipient such as metal oxides or hydroxides; a cross-linking aid such as polyfunctional unsaturated compounds, etc.; a processing aid such as a calcium stearate, etc.; and other additives, if required, according to the ordinary procedure such as roll mixing, kneading, Bambury mixing, etc. The composition can be cross-linked usually by primary cross-linking (press vulcanization) at about 100° to about 250° C. for about 1 to about 120 minutes and by secondary cross-linking (oven vulcanization) at about 150° to about 250° C. for 0 to 30 hours.

By using salicylaldoimino copper complex as a crosslinking agent for a fluorine-containing elastomer containing at least one of iodine and bromine in the molecule, a vulcanization product with an improved heat resistance can be obtained and generation of harmful substances such as methyl iodine, methyl bromine, etc. can be made less at the cross-linking.

Cross-linking of fluorine-containing elastomer by the salicylaldoimino copper complex is effective only for the fluorine-containing elastomer containing at least one of iodine and bromine in the molecule, and in case of fluorine-containing elastomer containing neither iodine nor bromine, there is no increase in the vulcanization torque and no vulcanization product is obtainable.

BRIEF DESCRIPTION OF THE DRAWING

Single drawing is a diagram showing vulcanizing curves determined in Examples and Comparative Examples.

PREFERRED EMBODIMENTS OF THE INVENTION

The present invention will be described in detail below, referring to Examples.

REFERENCE EXAMPLE 1

5,000 ml of water, 6.6 g of ammonium perfluorooctanoate and 1.6 g of $Na_2HPO_4 \cdot 12H_2O$ were charged into an autoclave having a net capacity of 10 liters and then the autoclave was flushed with a nitrogen gas. Then, the following compounds were successively charged into the autoclave:

| | |
|---|---:|
| 1-bromo-2-iodotetrafluoroethane | 7 g |
| perfluoro(2-bromoethylvinylether) | 67 g |
| hexafluoropropene [HFP] | 750 g |
| tetrafluoroethylene/vinylidene fluoride [TFE/VdF] mixed gas (molar ratio = 20:80) | 400 g |

Then, the autoclave was heated to 70° C., and 0.6 g of ammonium persulfate was added thereto to start polymerization reaction.

The pressure was decreased in the course of reaction, and thus the hexafluoropropene and the tetrafluoroethylene/vinylidene fluoride mixed gas in the above-mentioned molar ratio were partially added in a ratio of the former to the latter of 40:60 by weight to keep the internal pressure at 24 kg/cm² gage. Six hours after the start of the partial addition, the remaining gas was purged from the autoclave and the autoclave was cooled to terminate the polymerization reaction.

The resulting aqueous latex was salted out by an aqueous 10% sodium chloride solution, washed with water and dried, whereby 1,250 g of white rubbery terpolymer (copolymer rubber A; molar ratio of HFP:TFE:VdF=18:17:65, iodine content: 0.15 wt. %, bromine content: 1.11 wt. %) was obtained.

REFERENCE EXAMPLE 2

3,660 g of water, 66 g of hexafluoroisopropanol, 11.0 g of $Na_2HPO_4 \cdot 12H_2O$, 2.2 g of NaOH and 15.4 g of ammonium perfluorooctanoate were charged into an autoclave having a net capacity of 10 liters, and then the autoclave was flushed with a nitrogen gas, and the following compounds were charged into the autoclave:

| | |
|---|---|
| tetrafluoroethylene [TFE] | 653 g |
| perfluoro(methylvinylether) [FMVE] | 1,845 g |
| perfluoro(2-bromoethylvinylether) | 110 g |

Then, the autoclave was heated to 45° C., and 4.4 g of ammonium persulfate and 0.275 g of sodium hydrogen sulfite were added thereto to start polymerization reaction. The polymerization reaction was continued at that reaction temperature for 17 hours, and then unreacted gases were purged from the autoclave. Then, the autoclave was cooled to terminate the polymerization reaction.

The resulting aqueous latex was salted out by an aqueous 10% sodium chloride solution, washed with water and dried, whereby 1,050 g of white rubbery, terpolymer (copolymer rubber B; molar ratio of TFE:FMVE=61:39, bromine content: 1.27 wt. %) was obtained.

REFERENCE EXAMPLE 3

3,660 g of water, 66 g of hexafluoroisopropanol, 11.0 g of $Na_2HPO_4 \cdot 12H_2O$, 2.2 g of NaOH and 15.49 of ammonium perfluorooctanoate were charged into an autoclave having a net capacity of 10 liters, and the autoclave was flushed with a nitrogen gas, and then the following compounds were charged thereto:

| | |
|---|---|
| tetrafluoroethylene [TFE] | 312 g |
| vinylidene fluoride [VdF] | 704 g |
| perfluoro(methylvinylether) [FMVE] | 700 g |
| perfluoro(2-bromoethylvinylether) | 40 g |
| 1-bromo-2-iodotetrafluoroethane | 6.7 g |

Then, the autoclave was heated to 50° C., and 1.46 g of ammonium persulfate was added thereto to start polymerization reaction. The polymerization reaction was continued at that reaction temperature for 19 hours, and unreacted gases were purged from the autoclave when the internal pressure reacted 0.5 kg/cm² gage. Then, the autoclave was cooled to terminate the polymerization reaction.

The resulting aqueous latex was salted out by an aqueous 10% sodium chloride solution, washed with water and dried, whereby 1,550 g of white rubbery, terpolymer (copolymer rubber C; molar ratio of TFE:VdF:FMVE=21:21:58, iodine content: 0.16 wt. %, bromine content: 0.77 wt. %) was obtained.

REFERENCE EXAMPLE 4

3,660 g of water, 66 g of hexafluoroisopropanol, 11.0 g of $Na_2HPO_4 \cdot 12H_2O$, 2.2 g of NaOH and 15.4 g of ammonium perfluorooctanoate were charged into an autoclave having a net capacity of 10 liters, and the autoclave was flushed with a nitrogen gas, and the following compounds were charged into the autoclave:

| | |
|---|---|
| tetrafluoroethylene [TFE] | 653 g |
| perfluoro(methylvinylether) [FMVE] | 1,845 g |

Then, the autoclave was heated to 45° C., and 4.4 g of ammonium persulfate and 0.2759 g of sodium hydrogen sulfite were added thereto to start polymerization reaction. The polymerization reaction was continued at that reaction temperature for 17 hours, and then unreacted gases were purged from the autoclave. The autoclave was cooled to terminate the polymerization reaction.

The resulting aqueous latex was salted out by an aqueous 10% sodium chloride solution, washed with water and dried, whereby 1,010 g of white rubbery, terpolymer (copolymer rubber D; molar ratio of TFE:FMVE=61:39) was obtained.

EXAMPLES 1 to 3

Predetermined amounts of various additives and salicylaldoimino copper complex were added to one of fluorine-containing elastomer (copolymer rubbers A to C) prepared in Reference Examples 1 to 3, and the respective mixtures were mixed by a roll mill to prepare the corresponding compositions. The compositions were press-vulcanized for one hour at 200° C. (Examples 1 and 3) or 220° C. (Example 2) to obtain sheet-formed products.

TABLE

| Components (parts by weight) | Example 1 | Example 2 | Example 3 |
|---|---|---|---|
| Copolymer rubber A | 100 | | |
| Copolymer rubber B | | 100 | |
| Copolymer rubber C | | | 100 |
| MT carbon black | 30 | 20 | 20 |
| Calcium stearate | 3 | | |
| Zinc oxide | 7 | | |
| Salicylaldoimino copper complex | 4 | 4 | 4 |
| Torque increase (kg · cm/15 min.) | 2.8 | 4.0 | 4.6 |

Torque increase was determined by a JSR Type III curelasto meter, and vulcanizing curves of Examples 1 to 3 are shown in Figure.

COMPARATIVE EXAMPLE 1

When no salicylaldoimino copper complex was used in Example 2, no torque increase was observed at the press vulcanization at 220° C. for one hour, and no sheet was formed.

COMPARATIVE EXAMPLE 2

When the same amount of copolymer rubber D was used in place of copolymer rubber B in Example 2, no torque increase was observed at the press vulcanization at 220° C. for one hour, and no sheet was formed.

Vulcanizing curves of Comparative Examples 1 and 2 are shown in Figure.

What is claimed is:

1. A vulcanizable fluorine-containing elastomer composition, which comprises a fluorine-containing elastomer containing at least one of iodine and bromine in the molecule, and salicylaldoimino copper complex having the following formula as a cross-linking agent:

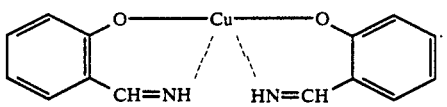

2. A vulcanizable, fluorine-containing elastomer composition according to claim 1, wherein the fluorine-containing elastomer containing at least one of iodine and bromine in the molecule is a fluorine-containing olefin copolymer obtained by polymerization reaction of fluorine-containing olefins in the presence of a saturated or unsaturated, linear or aromatic compound represented by the general formula $RBr_nI_m$, wherein R is a fluorohydrocarbon group, a chlorofluorohydrocarbon group, a chlorohydrocarbon group or a hydrocarbon group and n and m are 1 or 2.

3. A vulcanizable, fluorine-containing elastomer composition according to claim 10 wherein the fluorine-containing elastomer containing iodine in the molecule is a fluorine-containing olefin copolymer obtained by polymerization reaction of fluorine-containing olefins in the presence of an iodine-substituted aromatic compound, perfluoroaromatic compound, or saturated or unsaturated aliphatic hydrocarbon, fluoroaliphatic hydrocarbon or chlorofluoroaliphatic hydrocarbon.

4. A vulcanizable, fluorine-containing elastomer composition according to claim 1, wherein the fluorine-containing elastomer containing bromine in the molecule is a fluorine-containing olefin copolymer obtained by polymerization reaction of fluorine-containing olefins in the presence of a bromine-substituted aromatic compound, perfluoroaromatic compound, or saturated or unsaturated aliphatic hydrocarbon.

5. A vulcanizable, fluorine-containing elastomer composition according to claim 2, wherein the fluorine-containing elastomer containing at least one of iodine and bromine is contained at least one of iodine and bromine in a combining ratio of 0.001 to 10% by weight.

6. A vulcanizable, fluorine-containing elastomer according to claim 1, wherein about 0.1 to about 20 parts by weight of the salicylaldoimino copper complex is contained per 100 parts by weight of the fluorine-containing elastomer containing at least one of iodine and bromine.

* * * * *